May 19, 1931. G. L. VAIL 1,805,932
SYSTEM OF ICE MANUFACTURE AND REFRIGERATION
Filed July 12, 1927 3 Sheets-Sheet 2
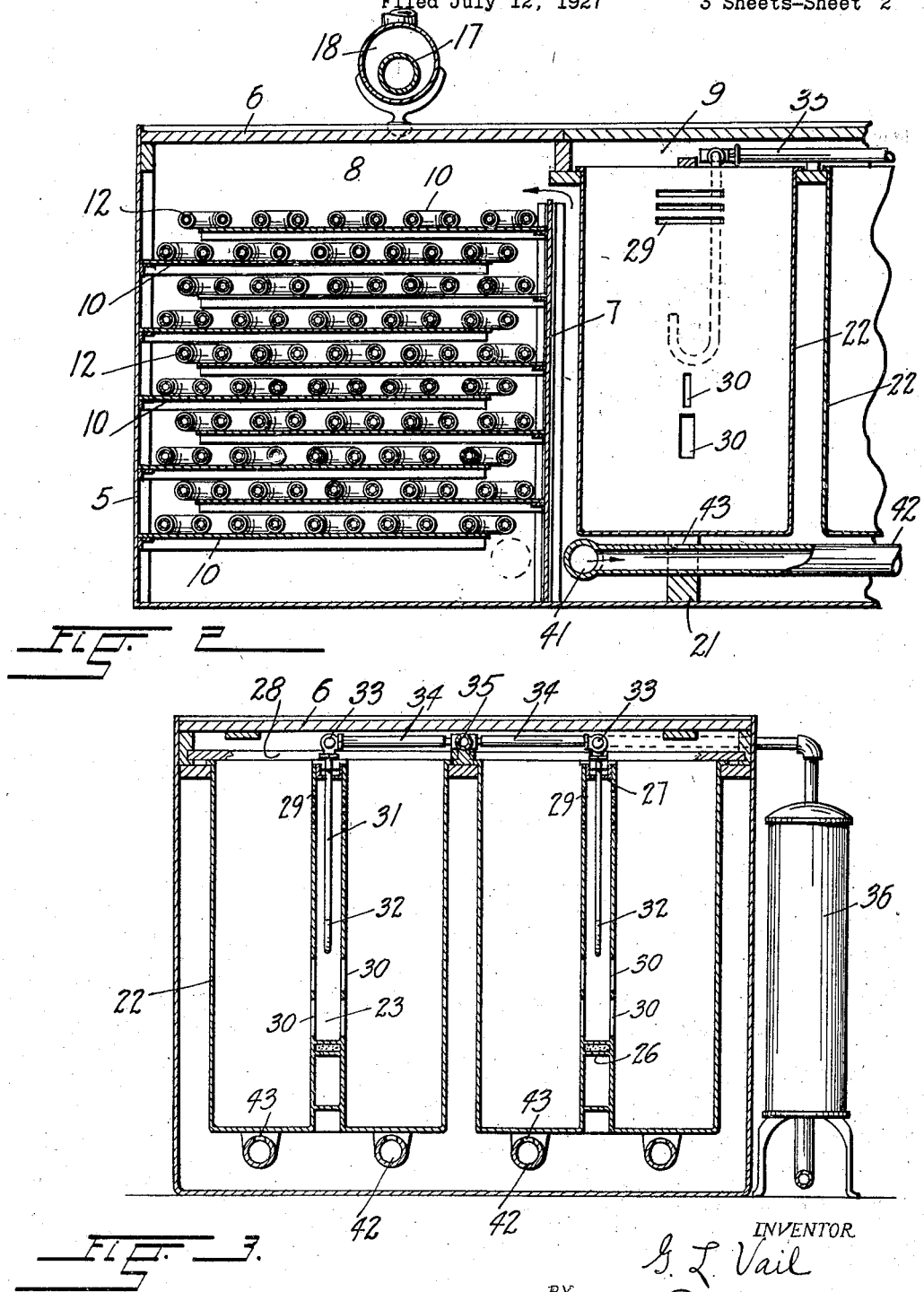

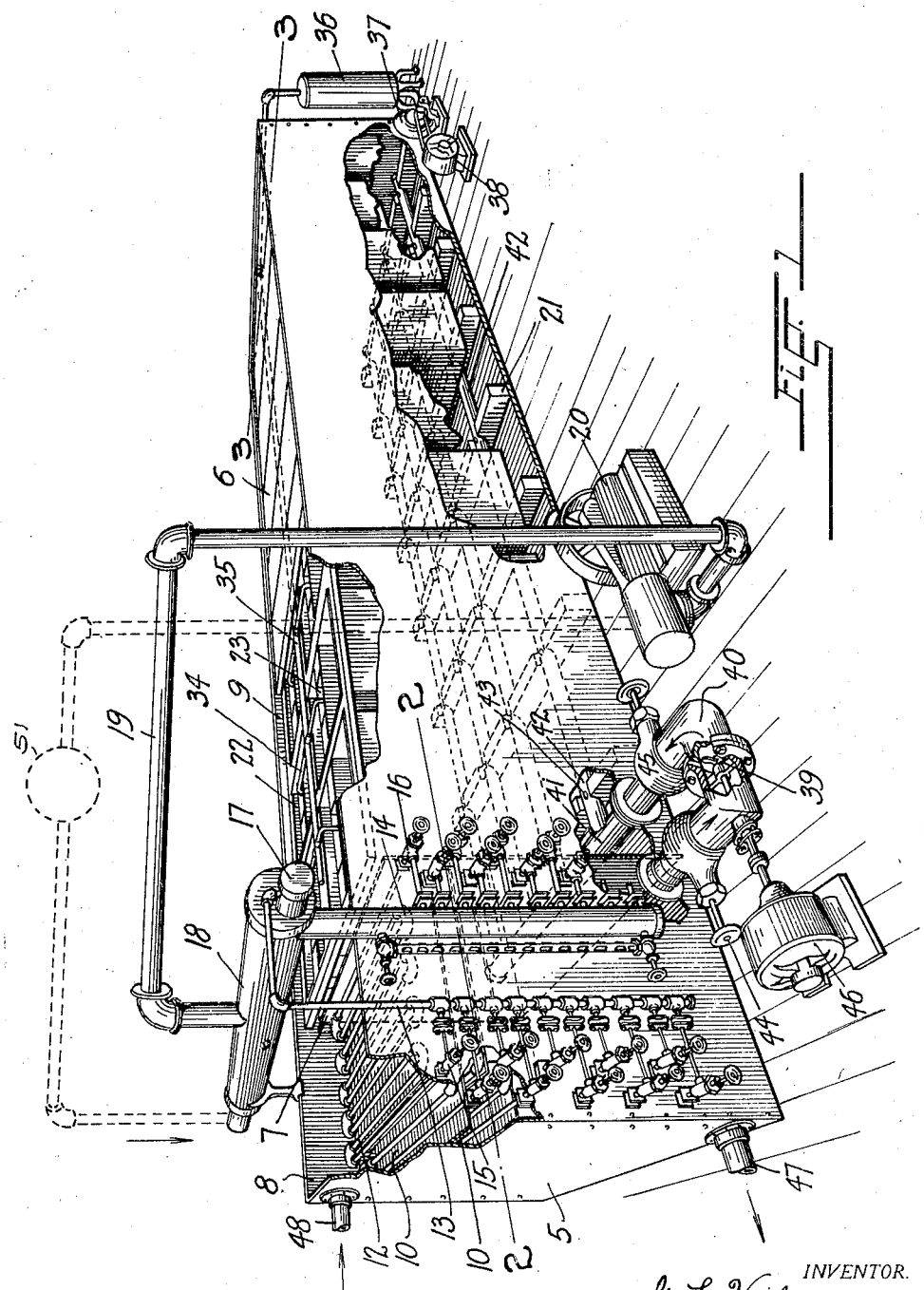

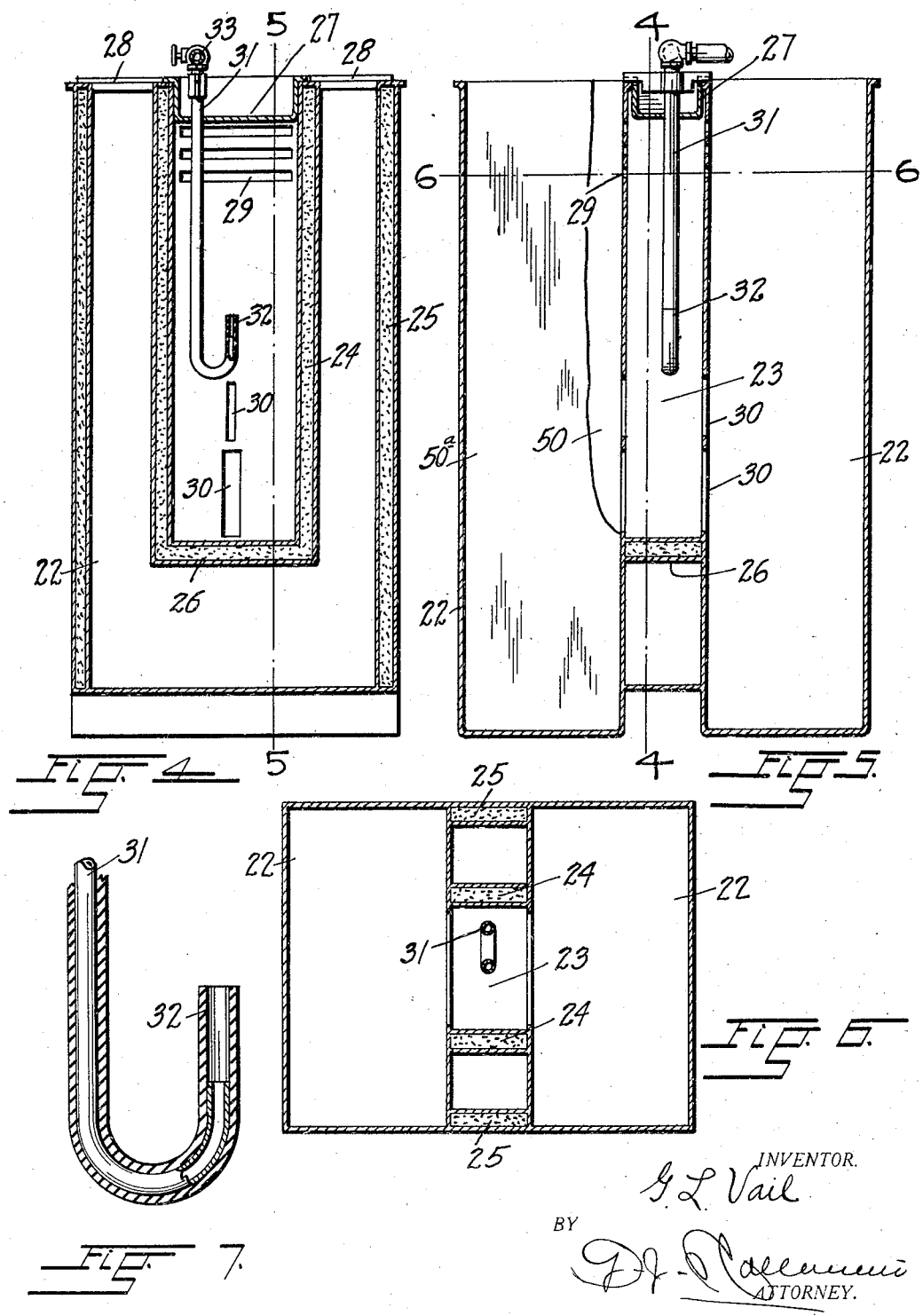

Patented May 19, 1931

1,805,932

UNITED STATES PATENT OFFICE

GEORGE L. VAIL, OF DENVER, COLORADO

SYSTEM OF ICE-MANUFACTURE AND REFRIGERATION

Application filed July 12, 1927. Serial No. 205,254.

This invention relates to a system of ice-manufacture and refrigeration and an object of the invention is to provide a system of the above stated character, which is simpler in the number and construction of its elements and which at the same time is more efficient and more economical in operation than the corresponding apparatus at present commonly used in refrigerating and ice manufacturing plants.

A further important feature of the invention resides in the provision of means for the production of a clear and transparent ice from ordinary undistilled water by the automatic elimination of impurities and air pockets during the freezing process.

Another aim of the invention is to produce by the above-mentioned means blocks of ice without the usual cores.

Another object of the invention resides in the provision of a refrigerating or ice producing plant which requires very little mechanical energy in its operation, which produces the desired results at a greatly reduced cost as compared with other plants of similar type, which is automatic in its action and which may be operated by but one attendant.

Still other objects of the invention, residing mainly in details of construction and novel arrangements and combinations of parts will be brought out in the course of the following description with reference to the accompanying drawings in which—

Figure 1 represents a partially broken perspective view of an apparatus in which the novel features of the system are embodied, Figure 2, an enlarged fragmentary section taken in the vertical plane indicated by the line 2—2 in Figure 1, Figure 3, a transverse vertical section taken along the line 3—3 in Figure 1, Figure 4, a vertical section through one of the freezing units included in the apparatus, on the line 4—4, Figure 5, Figure 5, a similar section at right angles to the other, taken on the line 5—5 in Figure 4, Figure 6, a horizontal section on the line 6—6 in Figure 5, and Figure 7, an enlarged sectional view of the lower end portion of an air conduit included in the construction of the freezing units.

Referring further to the drawings in the several views of which like parts are similarly designated, a preferably rectangular tank 5 is covered by a sectional top, the members 6 of which adjoin one another in substantially air proof relation and may be separately lifted to afford access to the parts of the apparatus immediately beneath the same.

The tank is divided by means of a vertical partition 7 into two compartments 8 and 9. The compartment 8 constitutes the brine cooling chamber of the apparatus and the compartment 9 the freezing chamber of the same. The partition 7 extends from the bottom of the tank upwardly to within a short distance from the top to provide an overflow for liquid from the freezing chamber to the cooling chamber in the operation of the system.

The cooling chamber is subdivided by a number of horizontal baffle plates 10 projecting alternately from opposite sides thereof to provide a circuitous, zig-zag course for the brine circulating through the tank from one compartment to another.

Placed above the baffle plates are ammonia coils 12, the ends of which project through a side wall of the tank. The projecting ends of the coils are connected respectively with headers 13 and 14 through the medium of valve controlled unions 15 and 16.

The header 13 consists of a small pipe connected with a reservoir 17 above the tank, which in practice is supplied with liquid ammonia from an ammonia condenser shown in broken lines at 51 in Figure 1 of the drawings.

The reservoir 17 has a surrounding jacket 18 which constitutes the gas receiver of the apparatus and this receiver connects with the second header which in comparison with the first described header, is of larger diameter.

A pipe 19 conducts the gases from the receiver to an ammonia compressor 20 which connects with the condenser above referred to. The freezing compartment 9 is occupied by a number of individually removable freezing units which are supported on transverse sills 21 above the bottom of the tank and which are accessible by removal of the superposed sections 6 of the top of the tank. Each unit, as illustrated in detail in Figures 4 to 7 of the drawings, has two freezing compartments 22 separated from each other by a water circulation space 23.

The circulation space is insulated at its ends and bottom by walls 24, 25 and 26 of non-conductive material so that the water therein is not subjected to the cooling influence of brine which in the operation of the apparatus constantly circulates through the freezing chamber around the freezing units. The water space 23 is closed at its top by a snugly fitting cover 27 and the freezing compartments 22 are closed by lids 28 which are spaced from the top of the chamber in which the units are disposed.

The walls of the freezing compartments separating them from the interposed water circulating space have at their upper ends horizontally disposed slots 29 and adjacent the bottom of the space, two vertically extending slots 30 formed in vertical alinement. Suspended into the space 23 through an aperture in the cover 27 thereof, is a pipe 31 the lower end of which is bent upwardly, at a point above the vertical slots.

The pipe is covered by a rubber tube 32 which extends upwardly beyond the extremity of the pipe for the purpose of preventing congelation as will hereinafter be more fully explained. The pipes 31 of the several units are by means of unions 33 and rubber hose connections 34 attached to a header pipe 35 which extends lengthwise of the freezing chamber in the space between the lids of the freezing units and the top of the chamber.

The end of the header pipe adjacent the partition between the chambers of the tank is plugged and its opposite end projecting through an opening in the end wall of the chamber 9, is connected with the air tank 36 of an air pump 37 which is driven from an electric motor 38.

The circulation of the brine employed in the operation of the system, is effected by means of a suction fan 39 in a connection between the two chambers 8 and 9 of the tank. The connection consists of a U-shaped conduit 40, one leg of which is fastened in an opening of the brine cooling chamber adjacent the partition 7 and the other leg of which connects at the opposite side of the partition with a header pipe 41 extending crosswise of the freezing chamber.

From the header pipe 41 extend a number of branch pipes 42 which are held in seats of the sills 21 upon which the freezing units are supported and these branch pipes have immediately below the freezing compartments of the freezing units, openings 43 for the upward emission of the brine.

Valves 44 and 45 in the legs of the U-shaped connection 40 control the flow of brine through the chambers of the tank, and an electric motor 46 has a driving connection with the suction fan.

For the purpose of connecting the tank with a refrigeration system or with other freezing machines of similar character, an outlet 47 in the bottom portion of the cooling chamber provides for drawing the brine from the chamber, and an inlet 48 near the top of the cooling chamber serves to return the brine to the same.

Having thus described the mechanical construction and cooperative arrangement of the elements included in the apparatus used in my improved ice manufacturing and refrigeration system, I desire it understood that many variations in said construction and said arrangement may be resorted to within the scope of my invention.

As an example the ammonia coils in the cooling chamber may be placed vertically instead of horizontally in which case the zigzag course of the brine through the chamber is accordingly arranged for the upward and downward flow of brine.

In the operation of the system the chambers 8 and 9 of the tank are filled with brine to a level determined by the overflow across the partition 7, the reservoir 17 is supplied with liquid ammonia from the ammonia condenser, and the freezing compartments and the circulation spaces of the several freezing units are filled with water.

The liquid ammonia entering the coils in the cooling chamber by means of the header 13, gasifies in the coils by expansion, and the gases after having circulated through the coils pass into the jacket 18 around the reservoir by medium of the header 14. The gases pass from the receiver to the compressor 20 in which the latent heat of the gases is converted into sensible heat and from where the gases move to the condenser in which the sensible heat is dissipated and the gases are re-liquefied to be returned to the ammonia reservoir and re-used in the operation of the system.

While the ammonia gases are thus circulated through the coils, the brine is circulated through both chambers of the tank by means of the suction fan 39. The brine withdrawn from the bottom portion of the cooling chamber, enters the header 41 and is emitted beneath the freezing compartments of the several freezing units through the openings 43 of the pipes 42.

The brine thus circulates constantly around the freezing units in an upward direction and returns to the cooling chamber across the overflow at the upper edge of the partition between the chambers. In this respect it is to be noted that the brine follows the zig-zag course in the cooling chamber by gravity and that the only power required to effect a continuous circulation of the brine, is that necessary to raise the brine from a level above the upper tier of coils in the cooling chamber to the slightly higher elevation of the overflow.

The brine continuously cooled by its circulation across and around the ammonia coils, absorbs the heat from the water in the freezing compartment of the freezing units, which heat is subsequently dissipated by the renewed contact of the brine with the coils. During the freezing process, air, preferably cooled to a temperature of from 25° to 30° is forced into the header pipe 35 by the operation of the pump 37, whence it is distributed through the connections 34 into the pipes 31 suspended in the circulation spaces of the several freezing units.

The air causes the water to circulate in each unit between the space 23 and the freezing compartments at opposite sides thereof, it being obvious that the water will be compelled to enter the freezing compartments through the horizontal slots 29 near the top thereof and to re-enter the circulation space through the vertical slots 30.

Owing to the insulated condition of the circulation space the water therein is not frozen under the influence of the circulating brine and as it passes through the freezing compartments, impurities contained in the water in said compartments are frozen out and washed or crowded into the circulation space where they accumulate until the water in the space becomes saturated with the impurities while the frozen water in the freezing compartments is comparatively pure and clear.

While the water in the freezing compartments is hardened into ice, passages adjacent the walls between the compartments and the circulation space remain open for the circulation of the water under the influence of the air constantly entering the space through the bent pipe 31. The passages above referred to have been indicated at 50 in Figure 5 of the drawings and the blocks of solid ice at 50a.

After the water in the freezing compartments of the units is completely frozen the units are removed from the tank and submerged in water after the water containing the impurities which were eliminated from the water in the freezing compartments during the freezing process, has been discharged from the circulation spaces.

The water in which the units are submerged, causes the blocks of ice to loosen from the walls of the freezing compartments and permits of easy removal of the ice blocks by inversion of the units.

It is to be understood that the air supplied to the freezing units through the pipes 31 is used for circulation purposes only and not for agitation of the water to be frozen as in other systems at present in use. In fact other power than air under pressure may be employed to produce a circulatory movement of the water in the circulation spaces, if so desired and this power may if necessary be applied individually to each unit separate from the others.

The non-metallic and non-conductive outlet at the end of the air pipes is essential to prevent congealment and consequent stoppage at the ends of the pipes.

The ice obtained by the method hereinabove described is clear and substantially free of impurities, since it is automatically clarified during the freezing process, nor is the ice clouded at its top which invariably takes place when air is used as an agitating agent.

My invention thus enables the use of ordinary water to produce ice of the purity and clarity heretofore obtained only by means of distilled water.

But little power is required in the operation of the system as hereinbefore explained, salt brine instead of calcium brine may be used owing to the peculiar arrangement of the elements of the apparatus which prevents freezing of the brine, and a considerable saving in the cost of material may thus be attained.

In order to employ the system for the purpose of refrigeration, all or part of the freezing units may be removed from the freezing chamber of the tank and the brine after it has been cooled in the cooling chamber can be pumped or otherwise conveyed to the cold storage places.

I claim:

1. In a system of ice manufacture, a freezing unit comprising a freezing chamber subject to exterior temperature conditions, an insulated circulation space connected with the freezing chamber by a horizontal upper slot and a vertical lower slot in a side thereof, and means to effect a circulatory movement of water in the circulation space into the freezing chamber through the upper slot and out of the same through the lower slot.

2. In a system of ice manufacture, a freezing unit comprising freezing chambers subject to outside temperature conditions, an insulated circulation space between the chambers and communicating with the chambers by openings in adjacent sides thereof, and means to effect a circulatory movement of water in the circulation space through portions of the freezing chambers.

3. In a system of ice manufacture, a freezing unit comprising a freezing chamber, a circulation space connected with the chamber by an upper opening and a lower opening in a side thereof, and a pipe having an upwardly ranging outlet in the circulation space between the openings, in connection with a source of air under pressure.

4. In a system of ice manufacture, a freezing unit comprising a freezing chamber, a circulation space connected with the chamber by an upper opening and a lower opening in a side thereof, and a pipe having an outlet in the circulation space between the openings, in connection with a source of fluid pressure.

5. In a system of ice manufacture, a freezing unit comprising a freezing chamber, a circulation space connected with the chamber by two openings in a side thereof, and a pipe having an outlet in the circulation space in connection with a source of fluid pressure and disposed to effect circulation of liquid from the chamber to the space through one opening and from the space to the chamber through the other opening.

6. In a system of ice manufacture, a freezing unit comprising a freezing chamber, a circulation space connected with the chamber by two openings one above the other in a side thereof, and a pipe having an outlet in the circulation space in connection with a source of fluid pressure and disposed to effect circulation of liquid from the chamber to the space through one opening and from the space to the chamber through the other opening.

In testimony whereof I have affixed my signature.

GEORGE L. VAIL.